Patented June 27, 1950

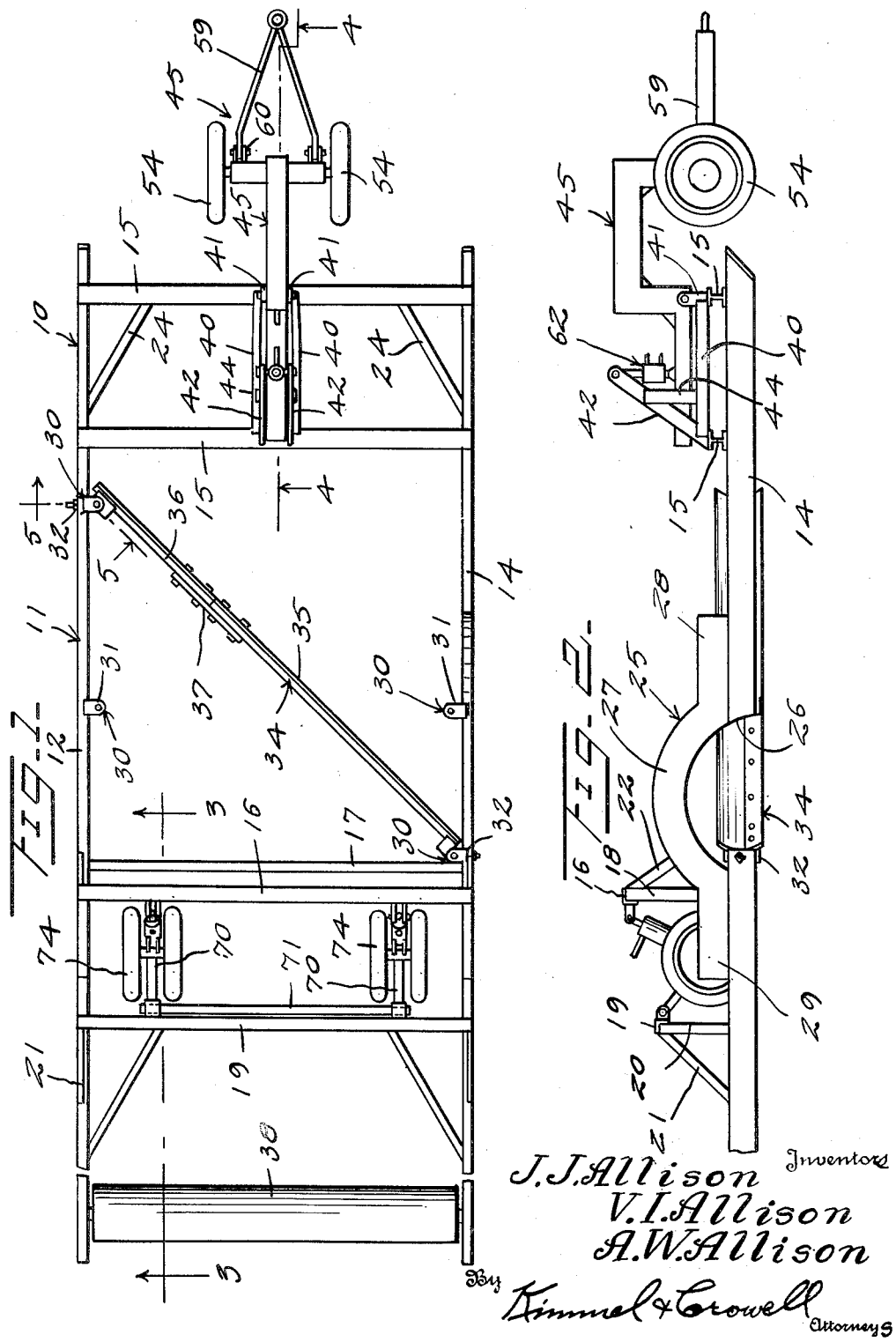

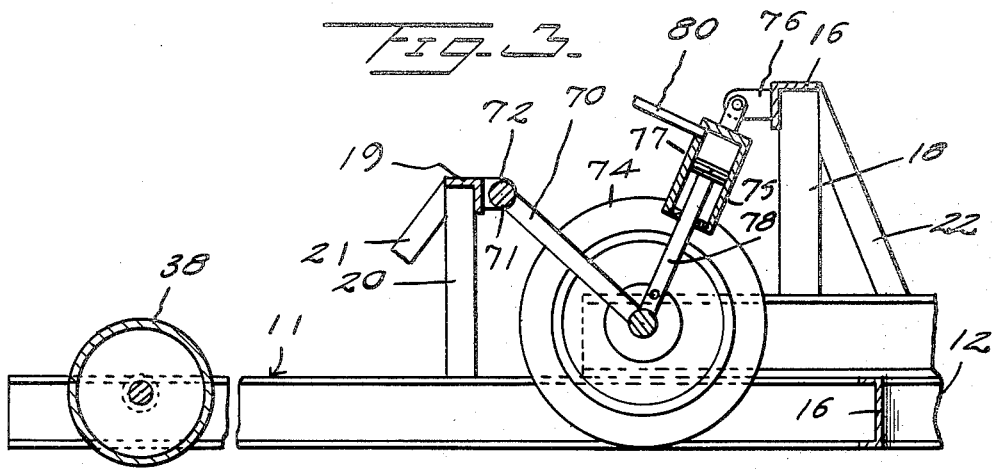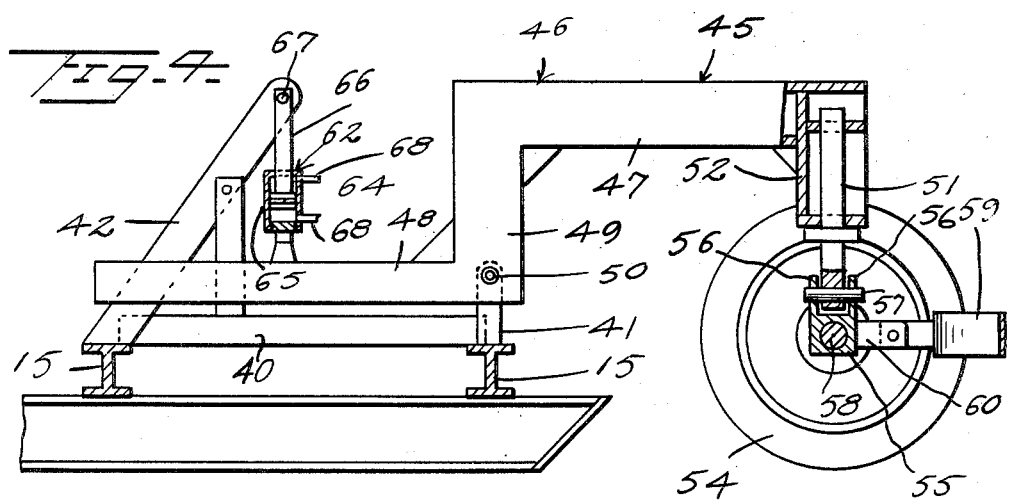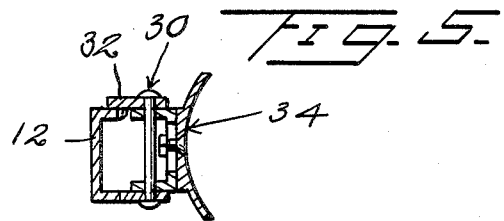

2,513,129

UNITED STATES PATENT OFFICE 2,513,129

LAND LEVELING DRAG

Alfred W. Allison, Vernon I. Allison, and John J. Allison, Chandler, Ariz.

Application August 15, 1947, Serial No. 768,876

1 Claim. (Cl. 37—150)

This invention relates to a land levelling drag and more particularly to a scraping tool which is adjustable vertically and has a scraping blade which may be fixed on the device at selected angles.

It is an object of this invention to provide a land levelling drag of the kind to be more specifically described hereinafter, having the front and rear end independently adjustable for varying the depth at which the scraping blade will engage the road or other surface.

Another object of this invention is to provide a levelling drag of this kind having a blade so disposed thereon for discharging the scraped material from one side of the device for forming hills or borders on each side of the scraped road or surface.

Another object of this invention is to provide a land levelling drag of this kind which is so constructed and arranged that the scraped material may be discharged from one side of the drag for filling ditches adjacent to the road or ditches alongside of borders which have been made with a disc or plow.

A further object of this invention is to provide a roller supported on the rear end of the land levelling drag for smoothing the surface behind the scraping blade.

With the above and other objects in view, our invention consists in the arrangement, combination and details of construction disclosed in the drawings and specification, and then more particularly pointed out in the appended claim.

In the drawings:

Figure 1 is a top plan view of a land levelling drag constructed according to an embodiment of our invention, Figure 2 is a side elevation partly broken away, Figure 3 is a longitudinal section taken on the line 3—3 of Figure 1, Figure 4 is a longitudinal section taken on the line 4—4 of Figure 1, and Figure 5 is a fragmentary detail section taken on the line 5—5 of Figure 1.

Referring to the drawings, the numeral 10 designates generally a land levelling drag which is adapted to be attached behind a tractor or other suitable vehicle for levelling a road or other surface by scraping.

The land levelling drag 10 is provided with a rectangular frame 11 which is supported at each end by wheels in such a manner that the frame 11 may be vertically adjusted at each end relative to the wheels at that end.

The frame 11 is formed of a pair of side frame members 12 and 14 which are connected together at their ends by horizontal end members 15 and 16.

The members 15 are welded or otherwise suitably attached to the upper edges of the frame members 12 and 14 near the front end thereof so that the ends of the side members 12 and 14 may slidingly engage over the earth's surface while the front end members 15 are disposed upwardly from the surface. One rear end member, as 17, is fixed between the side members 12 and 14 below the upper edges thereof and the rear end member 16 is fixed between the side members spaced upwardly therefrom.

A vertical brace as 18 is fixed on the side members 12 and 14 for supporting the end members 16 in spaced relation to the upper end of the side members and above the surface to be scraped. A transverse frame member 19 is supported rearwardly of the frame members 16 and spaced upwardly from the side frame members 12 and 14 by a vertically extending support 20.

Diagonal braces 21 and 22 are provided between the side frame members and the upper ends of the vertical supports 20 and 18 respectively. A pair of diagonal corner brace members 24 are fixed between the side members 12 and 14 and the most forward of the horizontal member 15.

One side member, as 14, is formed intermediate its length with an upwardly offset portion 25. The basic frame member 14 is divided intermediate its length to provide a longitudinal space 26 between the ends thereof. The offset portion 25 is formed of a beam having an upwardly bowed arcuate center portion 27 which is disposed above the space 26 between the front and rear members of the side frame member 14.

The upwardly bowed offset portion 25 is provided with a forwardly extending arm 28 and a rearwardly extending arm 29 which are secured to or formed on the side member 14 at each end of the opening 26. U-shaped scraper blade supporting members 30 are fixed to the side members 12 and 14 between the front and rear ends thereof. Another pair of blade supporting members 30 are fixed on each side member 12 and 14. One pair of such blade supporting members as 31 are disposed parallel to the end members 15 and 16 substantially at right angles or perpendicular to the longitudinal axis of the frame 11. Another pair of blade supporting members as 32 are fixed on the frame members 12 and 14 at an angle oblique to the longitudinal axis of the frame 11.

One blade supporting member 32 is fixed on the side frame member 14 at the rear end of the opening 26 while its corresponding blade supporting member 32 is disposed close to the front end of the side frame member 12.

When the blade 34 is fastened between the blade supporting members 32 the blade 34 is disposed at an angle oblique to the longitudinal axis of the frame 11 with the rear end of the blade adjacent the rear end of the opening 26 whereby material scraped on the blade 34 may be discharged through this opening.

The blade supporting members 31 are disposed forwardly of the opening 26 to provide a straight scraping device. The scraping blade 34 is formed of one portion 35 which is substantially the same length as the distance between the blade supporting members 31. When it is desired to support the blade 34 between the members 32 a second shorter blade 36 is fastened to one end of the blade 35 by suitable attaching plates 37 so that the length of the scraping blade 34 will be long enough to reach between the blade supporting members 32. The side frame members 12 and 14 are of such a length that they extend rearwardly beyond the rear frame members 16 and 19.

A weighted roller 38 is rotatably supported between the ends of the side frame members 12 and 14 for rolling the surface over which the scraping blade 34 has been moved. A pair of transversely offset supporting beams 40 are fixed between the forward frame members 15 at the center of the frame 11. A pair of upwardly extending lengths 41 are fixed to the forward end of the longitudinally extending beams 40 and extend upwardly therefrom.

A pair of upwardly and forwardly inclined brace members 42 are fixed to the rearmost of the forward frame member 15 and the supporting beams 40, and the front end of the supporting arms 42 are disposed substantially between the ends of the beams 40 and spaced vertically therefrom. A vertical supporting arm 44 is fixed between the beams 40 and the arms 42 intermediate the length of the arms 42.

A wheeled truck 45 is provided at the front end of the land levelling drag 10 for supporting the front end thereof. The wheeled truck 45 is formed with a beam 46 having a forwardly extending arm 47 and rearwardly extending arm 48 offset downwardly from the arm 47. A vertical connecting bar 49 engages between the rear end of the front beam 47 and the forward end of the rear beam 48. The beam 46 is pivotally connected between the lengths 41 by a pivot pin or bolt 50.

A trunnion 51 is rotatably supported in a downward extension 52 depending from the forward end of the front beam 47. A pair of wheels 54 are mounted on an axle 55 and the trunnion 51 is rockably and pivotally connected to the axle 55. A pair of upwardly extending ears 56 are formed on the axle 55 intermediate the length thereof being longitudinally spaced apart. A pivot pin 57 engages between the ears 56 and the lower end of the trunnion bolt 51.

The axle 55 is rotatable longitudinally about a pin 58 which extends through the wheels 54. The trunnion bolt 51 is then rockable longitudinally about the pivot 58 and pivotable transversly about the pivoting pin 57.

A drawbar 59 is pivotally connected to a pair of ears 60 which extend forwardly from the axle 55. A hydraulic ream or jack 62 is fixed on the upper surface of the rear portion 48 of the beam 46 and is formed with a cylinder 64 fixed to the beam 48. A piston 65 is slidable in the cylinder 64 and a connecting rod 66 is fixed at one end to the piston 65 and pivotally connected at the other end by a pivot pin 67 to the upper end of the supporting arm 42.

Hydraulic fluid tubes or connections 68 are connected to the opposite ends of the cylinder 64 for moving the piston 65 in both directions. The raising or lowering of the front end of the frame 11 relative to the wheels 54 is effected by movement of the piston 65 in the cylinder 64.

A forwardly extending drag link 70 is pivotally connected to the upper rearmost frame member 19. A drag link 70 is disposed on each side of the frame 11 between the side frame members 12 and 14. The drag link 70 is fixed on a rod or shaft 71 which is pivotally supported in a bearing 72 fixed on the member 19.

The shaft 71 extends transversely of the frame 11 to effect simultaneous and similar rocking movement of the wheels 74 supported on the lower ends of the links 70.

A pair of wheels 74 are rotatably supported on the lower end of each of the links 70. A hydraulic cylinder 75 is supported from the rear end of the rear frame member 16. The upper end of the cylinder 75 is pivotally connected between supporting ears 76 fixed on the frame member 16. The piston 77 is slidable in the cylinder 75 and a connecting rod 78 is fixed to the piston 77 at one end and pivotally connected to an arm 79 fixed on the lower end of the link 70.

A hydraulic tube or connection 80 is connected to the upper end of the cylinder 75 for admitting fluid under pressure therein to lower the wheels 74 relative to the frame 11. The weight of the scraper and frame is sufficient to lower the rear end of the frame so that no return fluid line is necessary for the rear end of the land levelling drag 10.

In the use and operation of this land levelling drag, the truck 45 on which the wheels 54 are mounted, is adapted to be biased to an erect position as shown in the drawings by the weight of the drag 10 and the force exerted by this weight on the drawbar 59. The admission of fluid pressure to the upper end of the cylinder 64 will effect pivotal movement of the beam 46 about the pin 50 and since the beam 46 will be substantially maintained in an erect position this movement will cause the raising of the front end of the frame.

The admission of fluid under pressure to the upper end of the cylinder 75 will effect raising of the rear end of the frame by rocking the drag link 70 downwardly about the pivot point 71. In this manner the frame 11 is supported on the wheels 54 and 74 for adjustment of either end individually or of both ends for the same distance to effect scraping of a surface at any desired level.

We do not mean to confine ourselves to the exact details of construction herein disclosed but claim all variations falling within the purview of the appended claim.

Having thus described our invention, what we claim is:

A land levelling drag comprising a rectangular frame including parallel spaced apart side members having flat bottom portions adapted to slidingly engage the land to be levelled, an upwardly offset portion intermediate the length of one of said side members, a transverse scraper blade, a pair of longitudinally spaced apart scraper supporting members on each of said side members, the rearmost of said supporting members on said one of said side members being disposed adjacent to the rear of said offset portion, and the other of said pair of supporting members on said one of said side members being disposed in transverse alignment with the rearmost of said supporting members on the other of said side members whereby said scraper blade when carried by said rearmost of said supporting members on said one side member and by the foremost of said supporting members on said other side member, will be disposed at an oblique angle to the longitudinal axis of said frame and the material scraped may be discharged outwardly through said offset portion, wheeled carriages disposed at the front and rear ends of said frame, and adjustable means interposed between each of said carriages and said frame and adapted to raise said frame relative to the land whereby said side members and said scraper blade may be disengaged from the land.

ALFRED W. ALLISON.
VERNON I. ALLISON.
JOHN J. ALLISON.

REFERENCES CITED

The following references are of record in the file of this patent:

UNITED STATES PATENTS

| Number | Name | Date |
| --- | --- | --- |
| 368,799 | Parmele | Aug. 23, 1887 |
| 832,978 | Jensen | Oct. 9, 1906 |
| 1,277,623 | Matthews | Sept. 3, 1918 |
| 1,473,405 | Goodell | Nov. 6, 1923 |
| 1,660,806 | Nelson | Feb. 28, 1928 |
| 2,022,757 | Buffington | Dec. 3, 1935 |